United States Patent [19]
Whittier et al.

[11] Patent Number: 4,915,579
[45] Date of Patent: Apr. 10, 1990

[54] PUMP SEALING APPARATUS

[75] Inventors: John D. Whittier, Lakewood; G. Michael Wilfley, Castlerock; Irvin F. Zagar, Denver, all of Colo.

[73] Assignee: A. R. Wilfley & Sons, Inc., Denver, Colo.

[21] Appl. No.: 232,626

[22] Filed: Aug. 15, 1988

[51] Int. Cl.[4] .......................... F16J 15/16; F16J 15/18
[52] U.S. Cl. ............................. 415/171.1; 415/173.3; 415/174.2; 277/25; 277/41
[58] Field of Search ............... 415/171.1, 173.3, 174.2, 415/34; 277/25, 41

[56] References Cited
U.S. PATENT DOCUMENTS

| | | | |
|---|---|---|---|
| 1,346,926 | 7/1920 | Wilfley | 415/34 |
| 1,976,532 | 10/1934 | Wilfley | 286/11 |
| 2,581,504 | 1/1952 | Wilfley et al. | 103/111 |
| 2,620,207 | 12/1952 | Wilfley | 286/11.11 |
| 2,660,487 | 11/1953 | Wilfley | 384/478 |
| 2,936,715 | 5/1960 | Southam et al. | 415/171.1 |
| 3,028,181 | 4/1962 | Thompson et al. | 415/174.2 |
| 3,137,237 | 6/1964 | Zagar et al. | 103/87 |
| 3,515,497 | 6/1970 | Studebaker et al. | 415/112 |
| 3,652,180 | 3/1972 | Choquette et al. | 415/113 |
| 4,289,445 | 9/1981 | Sims | 415/174.2 |

FOREIGN PATENT DOCUMENTS 140681  11/1960  U.S.S.R. .................. 415/34

*Primary Examiner*—Robert E. Garrett
*Assistant Examiner*—Hoang Nguyen
*Attorney, Agent, or Firm*—John E. Reilly

[57] ABSTRACT

A centrifugal pump of the hydraulic sealing type has a novel and improved sealing apparatus for establishing a hydraulic seal and limiting the flow of liquid from a pump casing into a reservoir or seal housing at one end of the pump casing, and a valve assembly in the seal housing has a valve member normally urged into engagement with the seal housing to isolate liquid in the seal housing from the casing when the pump is not in operation. When the pump is activated and brought up to speed, centrifugal force-responsive pivot members are operative to move the valve member away from sealed engagement with the seal housing to establish fluid communication between the seal housing and pump casing. The force-responsive pivot members are fully enclosed so as to be completely isolated from the liquid in the seal housing and yet be capable of operating directly in opposition to the resilient or spring-loaded valve to move the valve away from sealed engagement with the seal housing. An expeller ring at one end of the seal housing limits liquid flow into the seal housing when the pump is stopped and removes any liquid in the reservoir into the pump casing when the pump is started.

19 Claims, 2 Drawing Sheets

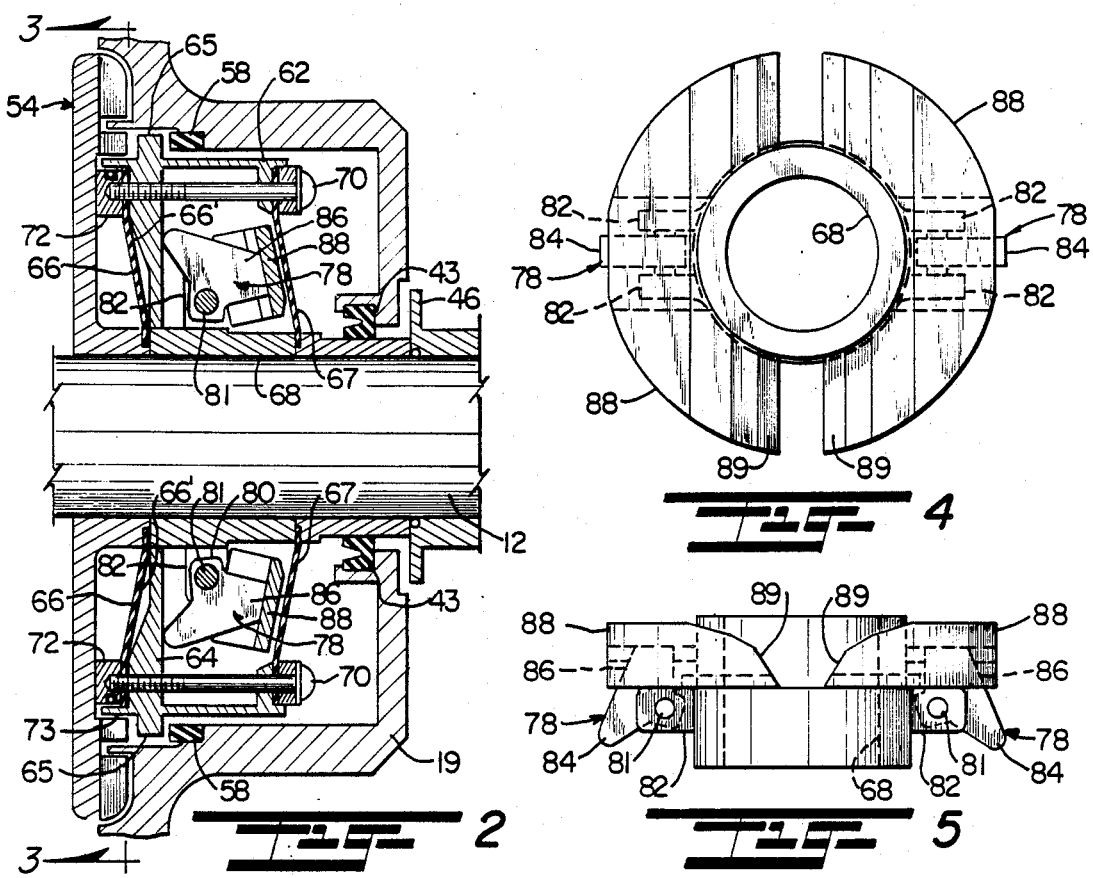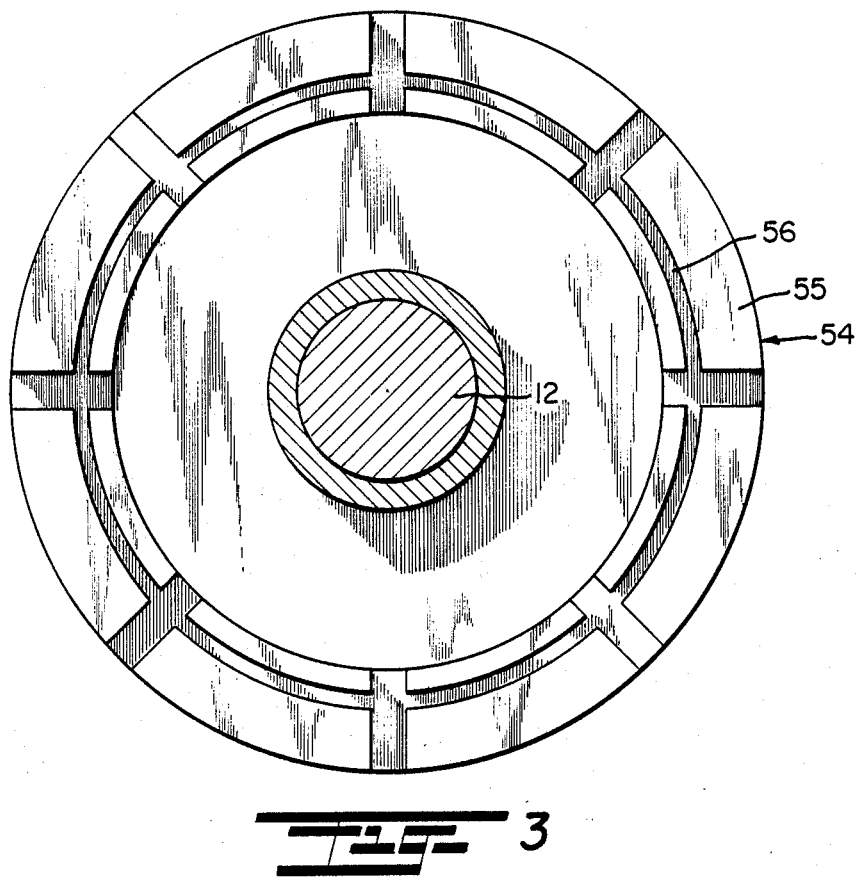

PUMP SEALING APPARATUS

This invention relates to pumping apparatus and more particularly relates to centrifugal pumps of the type establishing a mechanical seal when the pump is at rest and a fluid or hydraulic seal when the pump is in operation and with the added capability of operating without any frictional engagement of a seal or gland on any rotating element of the pump.

BACKGROUND AND FIELD OF INVENTION

A. R. Wilfley & Sons, Inc., the assignee of this invention, is noted for the innovative design and development of centrifugal pumps which are characterized by being of the fluid or hydraulic sealing type; i.e., do not require a packing gland or mechanical seal bearing directly against a rotating part, such as, the drive shaft, but are capable of effectively sealing against leakage when the pump is not in operation. For example, U.S. Pat. No. 1,976,532 and U.S. Pat. No. 2,660,487 to Wilfley are directed to frictionless pumps having no packing gland around the pump drive shaft but including a check valve assembly around the shaft which will open and close an annular gap between the shaft and pump housing in order to maintain the gap open while the pump is running and keep it closed when the pump is at rest. When the pump is running, one or more expellers draws fluid through the gap to generate counteracting hydraulic pressure or a seal to prevent leakage of the working liquid or slurry past the expeller and through the gap when the pump is in operation. The check valve assembly has a speed-responsive actuating mechanism that overcomes the normal urging of the valve into a sealed position to open the gap in response to a predetermined speed of rotation of the drive shaft by causing weighted levers to overcome the urging of the spring. Numerous improvements have been made by A. R. Wilfley & Sons, Inc. in this type of pump design and construction as exemplified by other U.S. Pat. Nos. 2,581,504; 3,137,237 to Zagar et al.; and U.S. Pat. No. 3,652,180 to Choquette et al. Among other problems associated with pump designs of the type described is that the weighted levers are normally exposed to the working fluid and any contaminants or foreign particles in the fluid. Moreover, liquid build-up in the pump casing behind the expeller region during intervals of starts and stops has necessitated leakage of that liquid away from the pump and is of particular concern when contaminants are present in the liquid.

It is therefore proposed in accordance with the present invention to overcome the problem of leakage by substantially reducing the volume of liquid retained in the reservoir region and to be able to store the liquid that does return to the reservoir or seal housing without leakage each time that the pump is started or stopped. When the pump is started, the valve assembly is actuated to open and an expeller ring will then discharge to the the extent of completely expelling the liquid stored in the reservoir. In accordance with conventional practice, another expeller member or members develops a hydraulic seal to prevent leakage back through the expeller region. Further, it is proposed to completely isolate the actuating mechanism of the valve assembly from the liquid in the reservoir but which mechanism will act in a positive manner in response to starting of the pump to overcome urging of a spring-loaded valve assembly to open and make possible the discharge of liquid by the expeller from the reservoir.

SUMMARY OF INVENTION

It is therefore an object of the present invention to provide for a novel and improved pump sealing apparatus which is compact, employs a minimum number of working parts and is highly reliable in operation.

It is another object of the present invention to provide for a novel and improved sealing apparatus for centrifugal pumps which is of durable construction and long-lasting in use and which is characterized by a normally closed valve assembly in which the actuating mechanism for opening the valve is sealed at all times from the working fluid so as not to be exposed to contaminants or foreign particles in the fluid.

A further object of the present invention is to provide in a centrifugal pump for a valve control for an expeller type seal which is normally closed when the pump is not in operation and which in response to centrifugal force is positively opened to clear or remove liquid from within the reservoir surrounding the valve control into an expeller region.

It is an additional object of the present invention to provide in a centrifugal pump for a combination of a seal housing, valve assembly and one or more expellers which, under normal operating conditions, will retain a minimum liquid level in and prevent leakage from the seal housing when the pump is starting up or shutting down and can be retrofit for use with virtually any type of centrifugal pump.

In accordance with te present invention, a preferred form thereof resides in a sealing apparatus for a centrifugal pump of the type having a pump casing and drive shaft mounted for rotation within the casing with an impeller at one end of the drive shaft within the casing to discharge fluid introduced via a fluid inlet into said casing through an outlet, there being one or more expellers to prevent fluid flow past the impeller when the pump is in operation, and a fluid channel is provided to establish fluid communication between the expeller and a seal housing portion of the pump casing when the pump is in operation. A novel and improved sealing apparatus comprises a seal housing at one end of the pump casing including a first surface which seals one end of the housing and a second surface on an interior wall of the seal housing between the first seal member and the expellers, valve means in the seal housing including a valve member and resilient means urging the valve member into sealed engagement with the second surface so as to completely isolate the seal housing from any fluid in the expeller region when the pump is not in operation, and centrifugal force-responsive means movable under a centrifugal force to move the valve member away from sealed engagement with the second surface in order to establish fluid communication via the fluid channel between the seal housing and expellers when the pump is in operation. A particular feature of the valve assembly is that the force-responsive means is a weighted pivot fully enclosed within the assembly so as to be completely isolated from the fluid in the seal housing and yet is capable of operating directly in opposition to the resilient means in moving the valve member away from sealed engagement with the second seal member. The valve assembly is disposed in a seal housing which provides a reservoir to retain liquid when the pump stops operating; and a novel and improved expeller ring cooperates with a baffle plate to minimize the amount of liquid retained in the reservoir when the pump is not in operation and will in addition clear the liquid from the reservoir when the pump is started.

The above and other objects, advantages and features of the present invention will become more readily appreciated from a consideration of the following detailed description of a preferred embodiment thereof, when taken together with the accompanying drawings, in which:

BRIEF DESCRIPTION OF THE DRAWINGS

FIG. 2 is a somewhat fragmentary, sectional view of sealing apparatus for the pump as illustrated in FIG. 1 and showing the relationship between parts when the pump is in operation;

FIG. 3 is a cross-sectional view taken about lines 3—3 of FIG. 2;

FIG. 4 is a view in detail of weighted pivot members employed in the sealing apparatus of the present invention; and FIG. 5 is a front view in elevation of the pivot members illustrated in FIG. 4.

DETAILED DESCRIPTION OF THE PREFERRED EMBODIMENT

Figure 1:
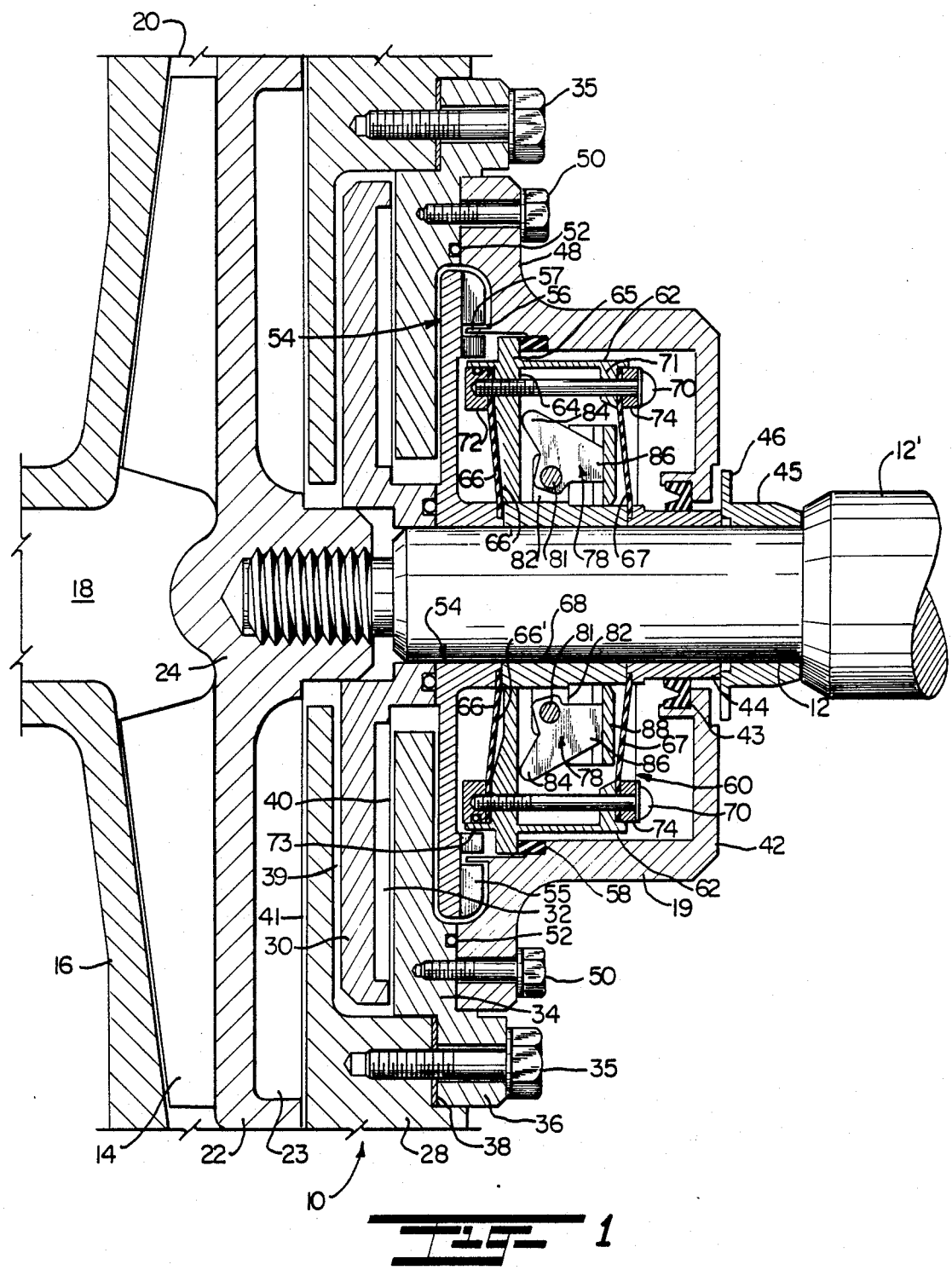
FIG. 1 is a cross-sectional view of the preferred form of centrifugal pump in accordance with the present invention and illustrated when the pump is not in operation.

There is shown by way of illustrative example in FIG. 1 a conventional type of centrifugal pump broadly designated at 10 including a drive shaft 12 and an impeller 14 mounted for rotation on the drive shaft 12 within an outer pump casing 16. The pump casing 16 has an inlet 18 at its forward end for introduction of a liquid or slurry and, under rotation of the impeller 14, the liquid is driven radially outwardly through the discharge or outlet 20 of the pump. Although not illustrated, the pump casing 16 is mounted on a suitable base and most desirably is mounted with the drive shaft disposed on a horizontal axis.

A primary expeller 22 is provided with vanes 23 on its rearward surface with the impeller vanes 14 on the forward or frontal surface of the expeller 22 so as to be carried for rotation with the expeller on a common hub 24 which is threaded onto the end of the shaft 12. Case plate 28 forms a unitary part of the pump casing 16 and is interposed between the expeller vanes 23 and a secondary expeller 30 which is rotatable with the shaft 12 and provided with rearwardly directed, radially extending vanes 32. The expeller 30 is interposed between the case plate 28 and a ring 34 which is attached to the case plate 28 by attaching bolts 35 extending through openings in spaced lugs 36 into threaded engagement with suitable bores in the case plate 28, and a gasket 38 is interposed between the confronting surfaces of the lugs 36 and case plate 28 to establish sealed engagement therebetween. As noted, the expeller 30 is axially spaced between the case plate 28 and the ring member 34 to establish circumferentially extending gaps 39 and 40. These gaps or spaces extend into communication with one another around the outer peripheral end of the expeller 30, and the gaps form a part of a continuous fluid channel which communicates with another circumferential gap or space 41 between the plate 28 and primary expeller vanes 23. Although not illustrated, in accordance with conventional practice, the pump casing or housing will enclose or extend in outer surrounding relationship to the expellers so that the fluid is confined within the gaps or spaces except of course at the discharge port 20.

A seal housing 19 is disposed at one end of and in communication with the pump case 16, the housing 19 being in the form of a generally cylindrical enclosure having a radial end wall 42 which terminates in outer spaced surrounding relation to the shaft 12 and has a first seal or safety barrier 43 disposed in loose-fitting outer surrounding relation to a sleeve 44 which is mounted on the shaft 12. One suitable type of a barrier is a "Viton U-Cup" seal sold by Mikron Products, of Glendale, California. Briefly, this seal is characterized by its ability to expand into sealed engagement with the sleeve 44 in the event that the seal housing should suddenly become filled with liquid; however, under normal operating conditions the barrier 43 would not frictionally engage the sleeve 44 but operate more to detect minor leakage past the seal or barrier 43.

An end sleeve 45 is disposed at one end of the shaft proper adjacent to enlarged shaft portion 12' with an outer circumferential flange 46 in axially spaced relation to the inner end of the wall 42. The housing 19 terminates at one end opposite to the wall 42 in an outer circumferential skirt 48 which is secured to the ring 34 by cap screws 50 extending through openings in the skirt into threaded engagement with the ring 34, and an annular seal 52 is disposed in inner spaced concentric relation to the cap screws 50 which are arranged at equally spaced circumferential intervals around the skirt 48. A cavity is formed between the skirt 48 and ring 34 in which is disposed a novel and improved expeller ring 54, shown in FIGS. 1 and 3, having radially extending, circumferentially spaced expeller vanes 55 in facing relation to the seal housing 19. It will be noted that the vanes 55 include a clearance space 56 to accommodate an axially directed baffle ring or plate 57 which projects forwardly from an internal wall surface of the seal housing and which will, in a manner to be described, discourage flow of fluid from the fluid channel back into the seal housing 19 when the pump is no longer operating. A second seal member is the form of an annular seal 58 is mounted for circumferential extension around a forward edge of the internal wall surface of the cylindrical portion of the housing 19 in confronting relation to the expeller member 54 so as to form a valve seat for a valve control assembly 60.

An important feature of the present invention resides in the construction and arrangement of the valve assembly 60 which is mounted on the shaft 12 between the expeller ring 54 and the end sleeve 45 and comprises a generally cylindrical seal ring 62 and a circumferentially extending, annular end wall 64 at one end of the ring 62 which terminates in an outer peripheral valve surface or rim 65 which is engageable with the seal 58. Axially spaced, annular elastomeric disks 66 and 67 are disposed at opposite ends of a governor sleeve 68, the latter being mounted for rotation with the shaft 12, and the radial inner ends of the disks 66 and 67 are tightly held to the extent of being fixed between the sleeve 68 and flanking portions of the expeller ring 54 and the sleeve 44. Outer peripheral ends of the disks 66 and 67 are correspondingly spaced apart by extension of circumferentially spaced bolts 70 through lugs 71 projecting inwardly from one end of the seal ring 62, and a lock ring 72 is positioned on a circumferential rib 73 and bears against one side of the disk 66. The bolts 70 extend through aligned openings in the lug 71, end wall 64, disk 66 and lock ring 72, and a washer 74 is interposed between the enlarged end of each bolt 70 and the disk 67.

Preferably, the disks 66 and 67 are composed of a plastic or synthetic rubber material, such as, a gasket material sold under the trademark "GYLON 3510" which is manufactured and sold by Garlock, a division of Colt Industries of Palmyra, New York. The disk 66 is united with a spring steel disk element 66' on the inside surface of the disk abutting the end wall 64, the spring 66' being biased to urge the entire assembly 60 in a direction causing the outer valve portion or rim 65 to bear against the seal 58.

The valve assembly 60 as described forms a sealed enclosure for weighted pivot members 78 which are pivotally mounted on the governor sleeve 68 in diametrically opposed relation to one another. As best seen from a consideration of FIGS. 2, 4 and 5, each pivot member 78 includes a radially inwardly directed portion 80 supported on pivot shaft 81 between closely spaced arms 82 which project radially and outwardly from the external surface of the governor sleeve 68. An angularly extending leg 84 inclines forwardly in a direction toward the end wall 64, and a rearwardly extending offset portion 86 terminates in an arcuate weight portion 88 which, when the pump is at rest, extends generally in a radial direction around one side of the spaced arms 82 and terminates in tapered edges 89. Briefly, when the shaft is rotated at a predetermined rate of speed, the centrifugal force will be sufficient to cause the arcuate portions 88 of the pivot members to swing radially outwardly with respect to the pivots 81 from the position illustrated in FIG. 1 to that illustrated in FIG. 2, thereby causing the legs 84 to advance forwardly into engagement with the end wall 64 and overcome the bias or urging of the spring-loaded disk 66.

As illustrated in FIG. 2, when the outer valve surface or rim 65 is moved away from the seal 58, any liquid contained within the seal housing 19 is free to advance past the valve rim 65 and is directed by the expeller vanes 55 through the cavity or space 40 surrounding the plate 34 and into the fluid channel or gaps 39, 40, 41 between the secondary and primary expeller regions as described. Of course, the valve control assembly 60 will remain open as long as the pump is rotated at a rate of speed to cause the weighted pivot members 78 to maintain their forwardly directed attitudes against the end wall 64. When the pump is deenergized and starts to approach a position at rest, the biasing effect of the disk spring 66' will gradually overcome the urging of the pivot members 78 to return the valve to its closed position. As this occurs, some liquid is free to leak past the outer valve rim 65 although this is discouraged to a great extent by the disposition of the baffle plate 57 in radially outwardly spaced relation to the valve seat 58. As a result, any liquid which does leak back into the seal housing 19 can be retained in the seal housing and does not have to be drained out of the housing when the pump is not in operation. Should a malfunction occur which would cause liquid build-up in the seal housing to a point above the interface of the seal 43 with the sleeve 44, the fluid or liquid pressure against the seal would cause it to expand into engagement with the sleeve to an extent or degree sufficient to prevent leakage. As described earlier, the seal 43 is capable of acting also as a safety barrier or detector in the event of any minor leakage of liquid and, under normal operating conditions, will not frictionally engage the sleeve when the shaft 12 is under rotation.

In the assembly of the present invention and particularly referring to the preferred form as described, the axial travel or movement of the valve assembly and specifically the disks 66 and 67 in advancing between an open and closed position may be very slight, for example, on the order of 0.090". For the purpose of illustration and not limitation, when the disks are assembled onto the shaft 12, the dimensioning is such that the spring 66' will be preloaded by the tightening of the impeller hub 24 on the shaft 12 to cause advancement of the valve rim 65 into contact with the seal 58, causing the disks 66 and 67 to be bent slightly as shown, for example, on the order of 0.060"; and, when engaged by the pivot members in moving against the end wall 64, may move only the remaining 0.030" to establish enough clearance for passage of the fluid from the reservoir defined within the seal housing 19. Although the disks 66 and 67 have been described as being composed of a synthetic rubber material, it will be apparent that they can be suitably composed also of a plastic or Teflon material depending upon the nature of the fluid being pumped. The seal 43 may be a standard type of lip seal which will act as a safety barrier to detect any leakage past this seal. In this relation, the pump of the present invention is adaptable for use, for example, with acids and slurries as well as mixtures of liquids and vapors.

While the sealing apparatus and specifically the expeller ring 54 and valve assembly 60 have been illustrated and described in a preferred form for use in association with a particular form or type of centrifugal pump, it will be evident that they are readily conformable for use with other types of centrifugal pumps and broadly are conformable for use with virtually any type of centrifugal pump whether or not a hydraulic seal is to be developed or maintained by an expeller member or members to counteract the hydraulic pressure of fluid being discharged by the impeller. Accordingly, the sealing apparatus lends itself well for use as a self-contained unit which can be retrofit to virtually any conventional type of centrifugal pump. It is therefore to be understood that various modifications and changes may be made in the construction and arrangement of parts as well as their specific intended applications without departing from the spirit and scope of the present invention as defined by the appended claims.

We claim:

1. In pumping apparatus wherein a centrifugal pump includes a drive shaft, a pump casing and a seal housing in outer spaced surrounding relation to said drive shaft, an impeller at one end of said drive shaft within said casing to discharge fluid introduced via a fluid inlet in said casing through an outlet, and a fluid channel is provided to establish fluid communication between said pump casing and said seal housing when said pump is in operation, the improvement comprising:

a valve assembly in said seal housing including a valve seat, a valve member and resilient enclosure means normally urging said valve member into sealed engagement with said valve seat whereby to completely isolate fluid retained in said seal housing from said pump casing when said pump is not in operation; and centrifugal force-responsive means mounted in said enclosure means so as to be isolated from fluid in said pump-casing and seal housing at all times, said force-responsive means movable under centrifugal force to engage said enclosure means to move said valve member away from sealed engagement with said valve seat whereby to establish fluid communication between said seal housing and said pump casing when said pump is in operation.

2. In pumping apparatus according to claim 1, said valve assembly mounted on said drive shaft, and said valve member having a seal ring extending radially outwardly from said drive shaft into normally sealed engagement with said valve seat.

3. In pumping apparatus according to claim 2, said enclosure means defined by axially spaced, radially extending elastomeric disks and an outer circumferentially extending wall in inner spaced concentric relation to the inner wall surface of said seal housing, and a spring member bearing against at least one of said disks whereby to urge said seal ring into engagement with said valve seat.

4. In pumping apparatus according to claim 3, said spring member being in the form of an annular plate of a size substantially corresponding to that of said one disk, said spring member being secured to a circumferential surface on one side of said one disk.

5. In pumping apparatus according to claim 4, means connecting said one disk to said seal ring, and inner peripheral edges of said disks mounted for rotation with said drive shaft.

6. In pumping apparatus according to claim 5, said enclosure means including a sleeve mounted on said drive shaft, said inner edges of said disks engaging opposite ends of said sleeve, said pivot means defined by diametrically opposed pivot arms pivotally mounted on said sleeve within said enclosure, means one end of said arm including a radially extending weight member and an opposite end of said arm engageable with said seal ring on a side opposite to the attachment of said one disk to said seal ring.

7. In pumping apparatus according to claim 1, an expeller ring interposed between said seal housing and pump casing, said expeller ring having circumferentially spaced, radially extending vanes, and a baffle ring on said seal housing projecting into the path of liquid flow between said vanes and said seal housing.

8. In pumping apparatus according to claim 7, said baffle ring extending normal to said vanes into a clearance space forming an interruption along the length of said vane.

9. In pump sealing apparatus for a centrifugal pump in which a pump casing includes a seal housing in outer spaced surrounding relation to a drive shaft, an impeller on said drive shaft within said casing to discharge liquid introduced through an outlet, expeller means are provided between said impeller and said seal housing to resist liquid flow past said impeller when said pump is in operation, and a fluid channel is provided to establish fluid communication between said expeller means and said seal housing when said pump is in operation, the improvement comprising an expeller ring mounted for rotation on said shaft in a circumferential space between said seal housing and said expeller means, said expeller ring having radially extending vanes disposed in facing relation to said seal housing, and a baffle plate on said seal housing projecting into said circumferential space and into the path of liquid flow between said vanes and said seal housing to discourage the flow of liquid from said pump casing into said seal housing.

10. In a pump sealing apparatus according to claim 9, said baffle plate being in the form of a circumferentially extending ring projecting into a clearance space formed in each of said vanes.

11. In a pump sealing apparatus according to claim 9, said seal housing having a valve seat therein, and a valve assembly including a valve member and resilient means urging said valve member into sealed engagement with said valve seat whereby to isolate liquid retained in said seal housing from said expeller means when said pump is not in operation.

12. In pump sealing apparatus according to claim 11, including centrifugal force-responsive pivot means movable into engagement with said valve member whereby to move said valve member away from sealed engagement with said valve seat and establish communication between said seal housing and said expeller means when said pump is in operation.

13. In pump sealing apparatus according to claim 12, said valve assembly mounted on said drive shaft, and said valve member being in the form of a seal ring extending radially outwardly from said drive shaft into normally sealed engagement with said valve seat and said valve assembly including an enclosure in which said pivot means is mounted to isolate said pivot means from liquid in said pump casing and seal housing at all times.

14. In pump sealing apparatus according to claim 13, said enclosure having axially spaced, radially extending elastomeric disks and an outer circumferentially extending wall in inner spaced concentric relation to the inner wall surface of said seal housing, said resilient means defined by a spring member bearing against at least one of said disks whereby to urge said seal ring into engagement with said valve seat.

15. In pump sealing apparatus according to claim 14, said spring member being in the form of an annular plate of a size corresponding to that of said one disk, said spring member being secured to a circumferential surface on said one disk.

16. In pump sealing apparatus according to claim 15, said enclosure including a sleeve mounted on said drive shaft, said inner edges of said disks engaging opposite ends of said sleeve, said pivot means defined by diametrically opposed pivot arms pivotally mounted on said sleeve within said enclosure, one end of said arm including a radially extending weight member and an opposite end of said arm engageable with said seal ring on a side opposite to the attachment of said one disk to said seal ring.

17. In pumping apparatus wherein a centrifugal pump includes a drive shaft, a pump casing including a seal housing in outer spaced surrounding relation to said drive shaft, an impeller at one end of said drive shaft within said casing to discharge liquid introduced into said casing through an outlet and expeller means are provided to limit liquid flow from said impeller into said seal housing when said pump is in operation, and a fluid channel is provided to establish fluid communication between said expeller means and said seal housing when said pump is in operation, the improvement comprising:

said seal housing defining reservoir means for retention of liquid without leakage from said housing when said pump is started or stopped, and a sealing surface on an interior wall surface of said seal housing;

a valve assembly in said seal housing including a valve member and resilient means urging said valve member into sealed engagement with said sealing surface whereby to completely isolate liquid retained in said seal housing from said pump casing when said pump is not in operation, and force-responsive means movable under centrifugal force to engage said valve member and move it away from sealed engagement with said sealing surface whereby to establish communication between said seal housing and said expeller means when said pump is in operation; and said expeller means expelling the liquid retained in said seal housing through said fluid channel when said pump starts into operation.

18. In pumping apparatus according to claim 17, said seal housing defining a continuation of said pump casing but of reduced diameter, and said seal housing having a radial end wall having one other of said sealing surface defining an interface between said end wall and said drive shaft.

19. In pumping apparatus according to claim 17, said valve assembly including an enclosure in which said force-responsive means is mounted to isolate said force-responsive means from liquid in said pump casing and seal housing at all times, said reservoir means being in the form of an annulus in surrounding relation to said valve assembly for retention of liquid when said pump is not in operation, and said expeller means having an expeller ring in facing relation to said valve assembly and traversing one end of said fluid channel.

* * * * *